(12) United States Patent
Zikeli et al.

(10) Patent No.: US 9,447,522 B2
(45) Date of Patent: Sep. 20, 2016

(54) EXTRUSION METHOD

(75) Inventors: Stefan Zikeli, Regau (AT); Friedrich Ecker, Timelkam (AT)

(73) Assignee: AUROTEC GMBH, Voecklabruck (AT)

( * ) Notice: Subject to any disclaimer, the term of this patent is extended or adjusted under 35 U.S.C. 154(b) by 78 days.

(21) Appl. No.: 14/241,645

(22) PCT Filed: Sep. 3, 2012

(86) PCT No.: PCT/EP2012/067078
§ 371 (c)(1),
(2), (4) Date: Feb. 27, 2014

(87) PCT Pub. No.: WO2013/030400
PCT Pub. Date: Mar. 7, 2013

(65) Prior Publication Data
US 2014/0367896 A1   Dec. 18, 2014

(30) Foreign Application Priority Data

Sep. 2, 2011   (EP) ..................... 11179865
Dec. 26, 2011  (CN) ..................... 2011 2 0551705 U

(51) Int. Cl.
*D01D 10/02* (2006.01)
*D01D 5/088* (2006.01)
*D01F 2/00* (2006.01)
*D01D 5/06* (2006.01)
(Continued)

(52) U.S. Cl.
CPC .......... *D01D 10/02* (2013.01); *B29C 47/0014* (2013.01); *B29C 47/0021* (2013.01); *B29C 47/0852* (2013.01); *B29C 47/30* (2013.01); *B29C 47/8875* (2013.01); *B29C 47/8885* (2013.01); *D01D 5/06* (2013.01); *D01D 5/088* (2013.01); *D01F 2/00* (2013.01); *D10B 2201/22* (2013.01)

(58) Field of Classification Search
None
See application file for complete search history.

(56) References Cited

U.S. PATENT DOCUMENTS 3,361,859 A   1/1968  Cenzato
5,171,504 A   12/1992 Cuculo et al.
(Continued)

FOREIGN PATENT DOCUMENTS

CN   101089252   12/2007
TW   303395      4/1997
WO   97/38153    10/1997

OTHER PUBLICATIONS

Volker Simon, "The Temperature of Fibers During Air-Gap Wet-Spinning: Cooling by Convection and Evaporation", Int. J. Heat Mass Transfer, vol. 37, No. 7, 1994, pp. 1133-1142.
(Continued)

Primary Examiner — Monica Huson
(74) Attorney, Agent, or Firm — Greer, Burns & Crain, Ltd.

(57) ABSTRACT

A method is provided for producing solid material filaments or films from a fluid of the material, by extruding the fluid by one or more extrusion openings and by solidifying the material in a precipitation bath. The formed material is guided between the extrusion openings and the precipitation bath by a lateral gas flow. The gas flow is subdivided into a hot partial flow and a cold partial flow. The material is initially brought into contact with the hot partial flow and subsequently with the cold partial flow prior to it being introduced into the precipitation bath. A device is also provided for extruding and forming materials.

14 Claims, 8 Drawing Sheets

(51) Int. Cl.
*B29C 47/00* (2006.01)
*B29C 47/08* (2006.01)
*B29C 47/30* (2006.01)
*B29C 47/88* (2006.01)

(56) References Cited

U.S. PATENT DOCUMENTS 5,679,379 A * 10/1997 Fabbricante et al. ............ 425/7

6,036,895 A 3/2000 Buedenbender et al.
7,070,403 B2 7/2006 Dzialas et al.

OTHER PUBLICATIONS

Taiwanese Office Action from Taiwanese Patent Application No. 101132062, dated May 5, 2016.

* cited by examiner

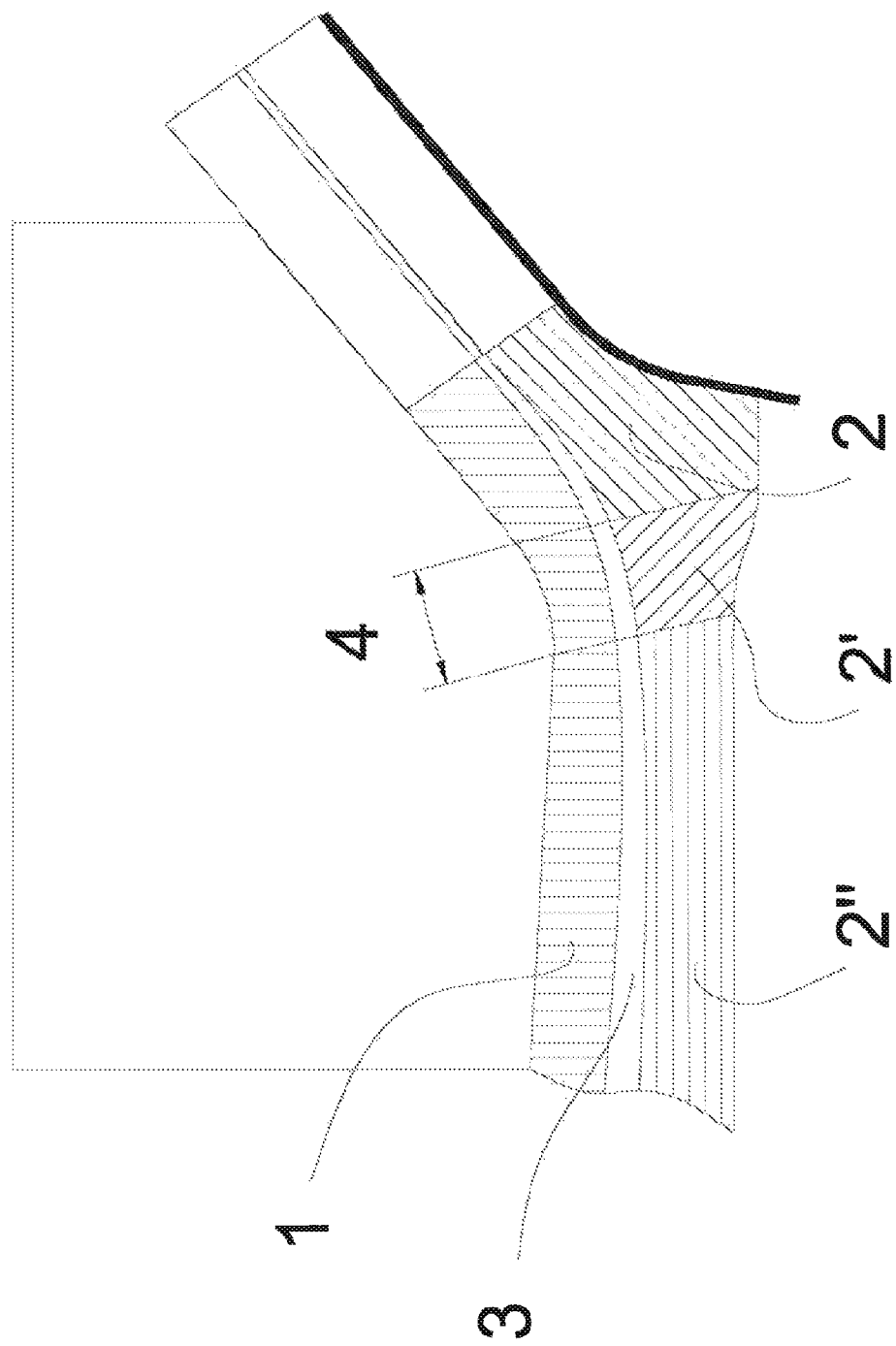

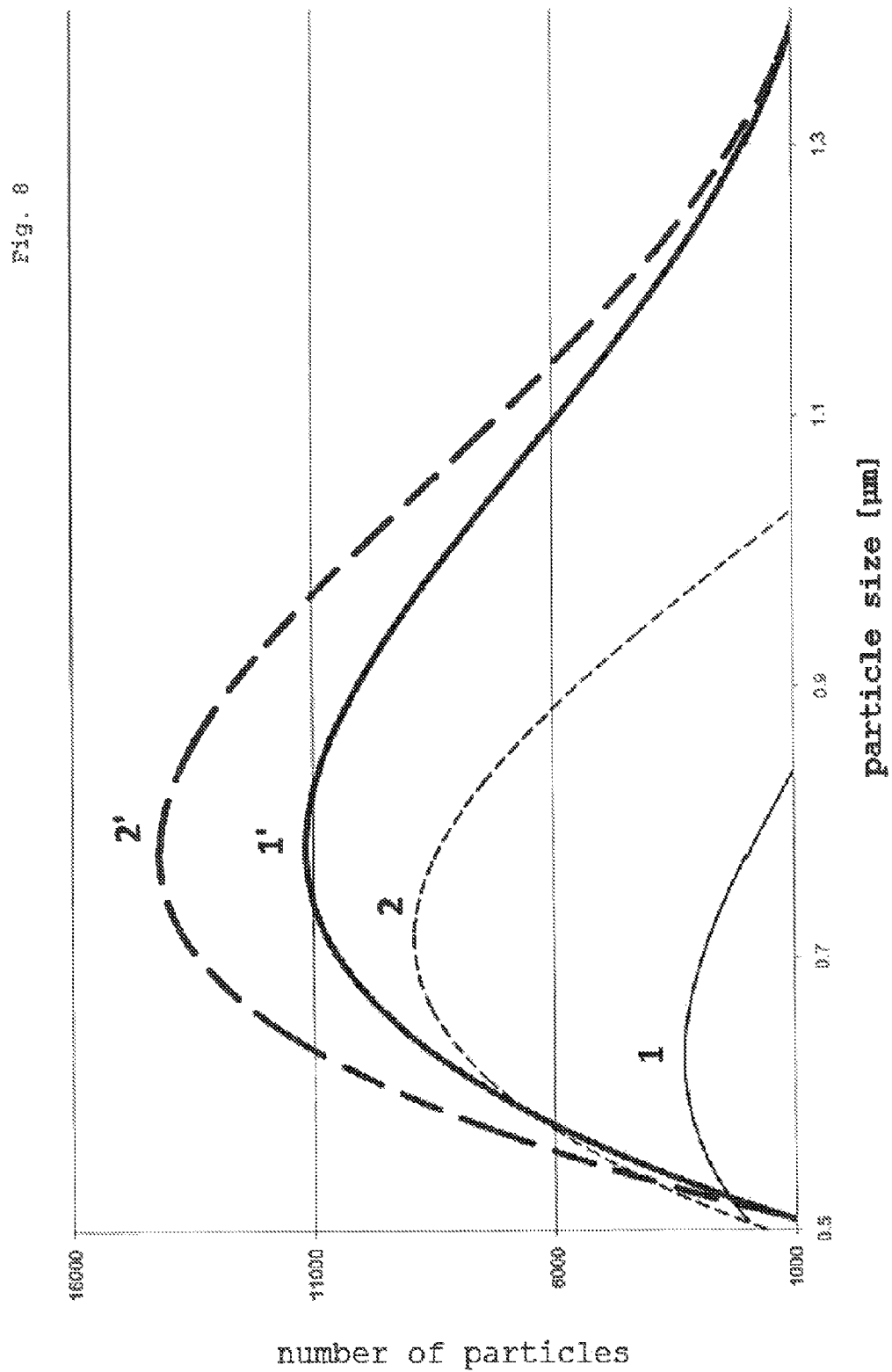

EXTRUSION METHOD

BACKGROUND

The present invention relates to extrusion methods, in particular for shaping polymer solutions or polymer fluids.

Cellulose and other polymers can be dissolved in suitable solvents and transferred by controlled solidification into a desired shaped article. If this shaped article is constituted by fibres, fibrils and the like, reference is also made to a spinning process. Cellulose is dissolved for example in aqueous solutions of amine oxides, in particular solutions of N-methylmorpholine N-oxide (NMMO), in order to produce spinning products, such as filaments, staple fibres, films, etc., from the obtained spinning solution. This occurs by precipitation of the extrudates in the water or diluted amine oxide solutions once the extrudates of the extrusion die are guided via an air gap into the precipitation bath.

U.S. Pat. No. 4,416,698 relates to an extrusion or spinning method for cellulose solutions in order to shape cellulose into fibres. In this case, a fluid spinning material—a solution of cellulose and NMMO (N-methylmorpholine N-oxide) or other tertiary amines—is shaped by extrusion and brought into a precipitation bath for solidification and expansion. This method is also known as the "lyocell" method.

U.S. Pat. No. 4,246,221 and DE 2913589 describe methods for producing cellulose filaments or films, wherein the cellulose is drawn in fluid form. These documents describe a spinning process in which cellulose is dissolved in tertiary amine oxide, wherein the obtained cellulose solution is pressed via a die, is extruded via an air gap into a spinning funnel, and is discharged at the end of the spinning funnel in the form of continuous fibre. The spinning funnel used is equipped with a feed means and a discharge means for the spinning bath.

A further method is described in U.S. Pat. No. 5,252,284, in which elongate shaping capillaries are used to shape a cellulose material.

WO 93/19230 A1 describes a further development of the lyocell method, in which the cellulose-containing spinning material is cooled immediately after the shaping process before introduction into the precipitation bath.

WO 94/28218 A1 describes a method for producing cellulose filaments, in which a cellulose solution is shaped into a number of strands via a die. These strands are introduced into a precipitation bath ("spinning bath") through a gap around which gas flows and are discharged continuously.

A shaping device and a further variant of the lyocell method are described in WO 03/057951, wherein the cellulose-containing spinning material, after shaping, is conveyed via a shielding region and then via a cooling region.

In EP 0 430 926 B1, a spinneret with a spinneret head and a spinning plate is presented, wherein the spinning plate consists of a stable carrier plate provided with bores. Spinneret plates, in which spinning capillaries are formed, are inserted into the aforementioned bores.

U.S. Pat. No. 5,171,504 A describes a spinning device for a thermoplastic polymer, wherein the molten polymer, after extrusion, is cooled in an air gap before it passes into a spinning bath. Immediately after extrusion, there is a "thermal conditioning zone" in the air gap, wherein the fibres are held at higher temperatures.

WO 97/38153 A1 relates to a lyocell method, in which two different air fans are used in the air gap and can be operated at the same or different temperature. This air fan is used to produce different levels of moisture in the two gas flows. A hot partial flow and a cold partial flow are not described in this document.

GB 900 099 A describes the spinning of polypropylene fibres by extrusion. This document discloses examples of alternative treatment experiments, in each of which a different temperature was used in the air gap. The simultaneous use of gas flows of different temperature is not described.

The publication "The Temperature of Fibres during Air-Gap Wet Spinning: Cooling by Convection and Evaporation"—Volker Simon (Int. J. Heat Mass Transfer. Vol. 37, No. 7, pp. 1133-1142, 1994) presents courses of events in the spinning process. It is stated that the polymer fed into the air gap contains water and that the water evaporates at the surface of the spinning fibre during the spinning process and this water evaporation has a cooling effect on the spinning fibre. It is concluded that the fibre temperature during extrusion is relatively high and the water concentration in the spinning environment is increased by the evaporation of the water from the fibre.

It is specified that the result is that the water vapour gradient causes the water vapour mass flow to be guided from the fibre in the direction of the surrounding environment. The water evaporation taking place in the filament is enabled by the quantity of water located in the filament, whereby a strong cooling effect, greater than with melt spinning, is produced. In a further statement, it is mentioned that the spinning material used in the NMMO method consists of a non-solvent (water), a solvent (amine oxide=NMMO) and cellulose. The author ultimately comes to the conclusion that the solvent does not evaporate during the shaping process.

SUMMARY

It has been found in accordance with the invention that the extrusion and subsequent cooling may lead to undesirable particle formation and deposits on the extruder or to contaminations of the individual spinning fibres. For example, immediately after extrusion and cooling, individual constituents of the material to be shaped may thus break away in the form of solid particles from the spinning fibres, which are still fluid, and may damage the apparatus or compromise the quality of the product. The object of the present invention is to provide improved extrusion methods in order to avoid these disadvantages.

The present invention therefore provides a method for producing solid material filaments, but also material sheets or films, from a fluid of the material by shaping the fluid or by pressing the fluid through one or more extrusion openings and solidifying the material in a collecting bath, wherein the shaped material is guided through a lateral gas flow between the extrusion opening(s) and the collecting bath, wherein the gas flow is divided into a hot partial flow and a cold partial flow, and wherein the material is brought into contact first with the hot partial flow and then with the cold partial flow before it is introduced into the collecting bath.

The invention further relates to an extrusion device, specifically a spinneret arrangement, for producing solid material filaments or films, comprising one or more extrusion openings, comprising a gas fan which has a plurality of discharge openings for laterally blowing a gas flow onto a material pressed through the extrusion openings, wherein part of the gas flow is guided as a hot partial flow and a further part is guided as a cold partial flow, and comprising at least one heating element for heating the gas flow in the hot partial flow. The device can be used to carry out the method according to the invention.

The hot partial flow is a heated partial flow of the gas flow. The material or parts thereof is/are thus prevented from transitioning into a solid state and forming deposits at the extrusion openings or on the spinning fibres or depositing in the region between the extrusion openings and the collecting bath as a result of particles ejected from the gas flow, such as crystallisation products or oligomers. The cold partial flow is a cooling partial flow of the gas, for example at air temperature. The temperature of the hot partial flow is preferably above the melting point of the anticipated particles. In the case of a fluid of cellulose-NMMO-water, which is normally extruded at temperatures from 80° C. to 105° C., particles of NMMO hydrate are anticipated. The hot partial flow should therefore have a temperature of at least 75° C. The region of the cold partial flow and of the hot partial flow border on one another directly, with the result that the extruded material experiences no considerable turbulences or differences in the gas flow velocity in the direction of extrusion. A gentle transition into the cold flow region is thus attained, and the depositions and breaking out of solidified particles from the material is prevented. In the cold partial flow, the tackiness of the material still in the fluid phase between the extrusion openings and the collecting bath (a "precipitation bath" for solidification of the material) is reduced. This cooling is not to take place immediately after the extrusion openings however, since it has been found that depositions and blockages of the openings may occur as a result. In particular, it has been found that even a heating in this region in front of the openings is advantageous.

Materials that have a high melting point or that are soluble at a high temperature are generally used. The temperature of the material at the extrusion openings may be between 70 and 130° C. The hot partial flow is preferably passed by the extrusion openings at hot temperatures with a difference from the temperature of the material of at most 20° C., in particular preferably at most 10° C. or 5° C. The temperature of the cold partial flow is preferably between 0 and 50° C.

The embodiments of the present invention are specifically characterised by a controlled flow of gas through the region between the extrusion opening and collecting bath. This results in the formation of the hot partial flow and the cold partial flow. The gas flow should be laminar and not turbulent in order to prevent a mixing of the partial flows or so as to result in insignificant mixing of the partial flows. Individual gas-guiding regions, in particular for the hot partial flow and the cold partial flow, are formed by controlled flow. The gas is preferably any inert gas which does not react with the material, preferably air. The individual partial flows of the gas flow, in particular of the hot partial flow and of the cold partial flow, are passed by the extruded material at substantially the same speed. The direction of extrusion is approximately normal to the direction of flow of the gas. The gas flow is fed only from one side onto the shaped material.

The region between the extrusion opening and collecting bath, the material still being fluid in this region, is also referred as the liquidus region. The material is solidified by entry into the collecting bath. Reference is made to a solidus region. In accordance with the invention, there is preferably no provision of shielding regions without gas flow in the liquidus region.

To attain a laminar gas flow along the extrusion device, a guide element may be provided. The gas flow may thus be guided in a laminar manner along the extrusion openings, even if it is guided over a curved path (for example with a curved or arched extrusion opening region on the extruder).

The gas flow is generally also guided over a curved path above the collecting bath, above the solidus line, depending on the gas flow via the extrusion device.

The region between the extrusion openings and the collecting bath is preferably flushed substantially completely by the lateral gas flow. Turbulences at the edges of the gas flow are thus avoided. The feedthrough of the shaped material through various gas zones at different flow rates, including stationary gases, is also avoided.

The fan is preferably arranged at an acute angle to the direction of extrusion. The gas flow obtains a flow component in the direction of extrusion at an angle slightly inclined with respect to the direction of extrusion, whereby a gentler progression of the solidifying material is attained. This is a further measure in order to prevent solidifying particles (for example of various additives) from separating from the material flow. Due to a suitable guide element, the gas can be guided in a laminar manner around the extrusion device in spite of the inclined onflow direction. Suitable guide elements are, for example, baffle plates or vents, with or without vacuum/suction. For example, the acute angle may be less than 85°, in particular less than 80°, less than 75°, less than 70°, less than 65°, less than 60° or less than 55°. The acute angle is preferably at least 30°, at least 35°, at least 40°, at least 45°, at least 50°, at least 55°, at least 60°, at least 65°, at least 70° or at least 75°. In addition, a dynamic pressure is produced at the surface of the collecting bath due to this acute angle of the fan arrangement, whereby the medium contained in the bath decreases on the fan side/onflow side. Different residence times are thus produced in the fan flow for the fluids (spinning fibres) on the onflow side and on the flow-off side. This optimises the different residence times with different viscosities of the fluids due to different temperatures on the onflow side (generally cooler) and on the flow-off side (warmer due to the cold gas flow heated by the fluid).

In addition, it is possible to allow the extruded fluid to flow at an acute angle onto the collecting bath. Due to due extrusion openings (spinneret) arranged in such an inclined manner, the spinning fibres experience different residence times in the gas flow region from the fan on the flow-off side and on the onflow side. On the onflow side, the fibres are cooled to a greater extent than on the flow-off side, whereby different viscosities of the fluid are produced. These residence times are preferably longer in the case of higher viscosity (generally on the onflow side) than with lower viscosities (generally on the flow-off side). The acute angle is preferably at least 10°, at least 20°, at least 30°, at least 40°, at least 50°, at least 60°, at least 70°, at least 80°, or less than 85°, in particular less than 80°, less than 75°, less than 70°, less than 65°, less than 60° or less than 55°. The angle is preferably between 10° and 45°.

Before the extrusion through the extrusion openings, the material can be collected and/or temperature-controlled in an extrusion chamber. Additives can also be added to the material before extrusion, for example in the chamber. The extrusion chamber is preferably heated by a heating element, for example by a heat transfer medium, which is guided in heating channels. This heating element or a further heating element can also be used to heat the extrusion openings. The openings can be formed in an extrusion plate, which preferably has a heating element. The coefficient of thermal conduction of the extrusion plate is preferably in the region of the coefficient of thermal conduction of metals, for example it may be between 5 to 100 W/mK, preferably 10 to 60 W/mK. The extrusion plate and the material of the fan (in particular the partition walls between the individual discharge openings of the fan), can be produced from different materials, such as steel, high-grade steel, ceramic, sintered metals, aluminium, plastic, non-ferrous metals or noble metals. Preferred materials are all irons, iron alloys, chromium-nickel steels, nickel steels (for example Hastelloy materials), titanium, tantalum, silicon carbide, glass, ceramic, gold, platinum and also plastics. Special materials are alloys having a high molybdenum content or nickel, chromium and molybdenum alloys for resistance to pitting and crevice corrosion or nickel-copper alloys with high tensile strength. Material examples include Hastelloy C (high resistance to corrosion), Hastelloy B (precipitation-hardening high-temperature alloy), Inconel (resistance to stress corrosion cracking in petrochemical applications), Incoloy (high strength and resistance with respect to high temperatures and with respect to oxidation and carburisation) and Monel (high tensile strength, resistant to corrosion). A material having a thermal conductivity from 5 to 100 W/mK, particularly preferably from 10 to 60 W/mK, is preferably selected.

The extrusion plate can be fastened arbitrarily to the extrusion device, including by means of detachable fastenings for easy exchange of the plate. The plate can also be welded on, glued on or flanged on or fastened by clamps or rivets. The extrusion plate may also be coated, in particular to repel the extruded material or for improved transfer of heat.

The extrusion plate preferably has a thickness of at most 20 mm, particularly preferably at most 15 mm, at most 12 mm, at most 10 mm or at most 8 mm.

The heated partial flow is preferably heated by an extrusion plate comprising the extrusion openings and/or by a heating element.

The fan preferably contains a plurality of discharge openings for the gas flow. For example, a plurality of channels may be provided in the fan for this purpose. These channels are preferably arranged in a close-fitting manner, for example in a honeycomb form. To create a hot partial flow, one side of the fan may be heated, wherein the heat for heating may be passed on to a certain extent through the separations between the channels, continuously in a decreasing manner. The channels which lead to the cold partial flow should thus remain largely unheated or should be heated to the desired low temperature.

Before extrusion, before the extrusion openings or in the extrusion chamber, the fluid material is pressed at high pressures, for example by a pump. In specific embodiments, the pressure is at least 100 bar, preferably at least 200 bar, at least 300 bar, at least 400 bar, at least 500 bar, at least 600 bar, at least 700 bar, or at least 800 bar.

A plurality of extrusion openings is preferably provided in the direction of the lateral gas flow. The extrusion openings can be provided on a cambered, that is say curved, extrusion plate, wherein the angle of curvature a at the edge of the extrusion plate to the direction of extrusion is an acute angle. The angle of curvature a is preferably less than 85°, in particular less than 80°, less than 75°, less than 70°, less than 65°, less than 60° or less than 55°. This embodiment is preferably combined with the aforementioned guide element to remove and/or feed the gas flow. The gas flow is thus guided along the extrusion plate along the cambered or curved region. The profile of the formation of the extrusion openings can be adapted by a curvature to the profile of the surface of a liquid in the collecting bath. By flowing the material into the collecting bath, the surface of the liquid is curved there, whereby, with a flat guidance of the extrusion openings, the middle material jets require a longer travel time than the outer material jets. Inhomogeneities may thus be produced by different residence times in the cold partial flow. These are avoided in accordance with the invention.

The material which is shaped by extrusion in accordance with the invention may be a thermoplastic material, in particular a viscous fluid. The material is preferably selected from a cellulose solution, solidifiable fluids, in particular "hot-melts", such as polymers, polycarbonates, polyesters, polyamides, polylactic acid, polypropylenes, etc. Cellulose solutions are in particular cellulose amine oxide solutions, specifically solutions of tertiary amine oxide solutions. One example is a cellulose NMMO solution, as described in U.S. Pat. No. 4,416,698 or WO03/057951 A1.

Cellulose solutions ranging from 4 to 23% cellulose are preferably used for processing into extrusion products.

The material may be an aqueous solution. The material may be thixotropic fluid, in particular a spinning solution.

Specific materials have a melting point of at least approximately 40° C., at least 50° C., at least 55° C., at least 60° C., at least 65° C., at least 70° C. or at least 75° C. The material may be guided at exemplary temperatures of at least approximately 40° C., at least 50° C., at least 55° C., at least 60° C., at least 65° C., at least 70°, at least 75° C., at least approximately 80° C., at least 85° C., at least 90° C. or at least 95° C. The zero shear viscosity of the fluid is preferably in the range from 100 to 15,000 Pas, in particular between 500 and 10,000 Pas.

The discharge openings can be selected in any form in order to shape the material. Elongate openings for shaping films or small, round openings for shaping filaments or fibres are possible. The openings are preferably at most 2 mm, at most 1.5 mm, at most 1.2 mm, at most 1.1 mm or at most 1 mm narrow or in diameter. The openings may be at least 0.1 mm, at least 0.2 mm, at least 0.3 mm, at least 0.4 mm, at least 0.5 mm, at least 0.6 mm, at least 0.7 mm, at least 0.8 mm or at least 0.9 mm narrow or in diameter. After the discharge, the material is indeed in the shaped state, but is still in fluid phase.

Media, liquids and/or temperatures in/at which the material solidifies can be provided in the collecting bath. For example, liquids or solutions can be used in which the material is not soluble and thus precipitates. Alternatively or additionally, lower temperatures can be selected, at which the material solidifies in the solidus zone. The filaments, fibres or films according to the invention can be produced by precipitation that is continuous at least occasionally. The filaments, fibres or films can be discharged continuously or discontinuously from the collecting bath. The medium or the liquid in the collecting bath may also be renewed continuously or discontinuously. The temperature of the collecting bath can be controlled to a specific temperature, for example by heating or cooling elements or by control of the medium change.

BRIEF DESCRIPTION OF THE DRAWINGS

The present invention will be illustrated further by the following figures and examples without being limited to these specific embodiments of the invention.

In FIG. 1, the gas flow discharge openings 3 are illustrated schematically by a honeycomb profile, which is directed in the direction of the extruded material flow. Heating elements 10, in this case heat carrier lines, may be received in the extruder.

FIG. 7 shows a heat profile of the gases in the individual regions during the operation of a device according to FIG. 5. Region 1 shows a relatively constant temperature (90° C.) of the hot partial flow from the fan, via the spinning region 4, to the exhaust air (adiabatic). The cooling partial flow is first cooled in the region 2 (25° C.) and is heated gradually by contact with the spinning material in the treatment region 2'. The temperature is therefore increased in the exhaust gas flow 2" to approximately 50-60° C. A transition region 3 of medium temperature is arranged between the hot partial flow and the cold partial flow.

FIG. 8 shows a particle size distribution for various positions of the aerosol measurement, curves 1 and 1' corresponding to the particle distribution in the region of the spinneret (1) and 200 mm away on the flow-off side of the nozzle (1') for a configuration according to the invention with hot partial flow and cold partial flow. Curves 2 and 2' correspond to the particle distribution in the region of the spinneret (2) and 200 mm away on the flow-off side of the nozzle (2') for a comparative configuration with just one uniform cold flow without hot partial flow. The accumulation of harmful particles was considerably reduced due to the heating of the spinning material after the nozzle discharge (curve 1).

DETAILED DESCRIPTION

Example

In accordance with this example, an extrusion device as illustrated in FIG. 1 is used. In this form, an extrusion device contains an extrusion plate 6, which is curved in the direction of the gas flow, with a profile at extrusion openings 1 which reproduces the profile of the surface of a water bath as a collecting bath when the material fluid flows thereinto. As a result of extrusion under pressure, the material fluid is shaped by the shape of the extrusion openings, for example into filaments, and is drawn further by passing through the gas flow. As a result of cooling, the tackiness is reduced in order to prevent adhesion upon entry into the water bath.

A lateral fan air flow is attained in a hot region and a cold region by heating the upper part of the fan and also the extrusion plate. The gas is diverted by a baffle plate as a flow-guiding element in order to preserve a laminar flow in the region of the material flow.

During operation, an extrusion device according to FIG. 3 was tested when spinning cellulose filaments with a cellulose-NMMO-water solution.

Analysis of the Conditions in the Air Gap

A spinning solution (cellulose: 12.9%, NMMO 76.3%, water 10.8%, all % in % by weight) is produced by mixing an aqueous amine oxide solution and cellulose by removing excess water in an evaporation process upstream of the spinning process, wherein the cellulose (the polymer) dissolves in the concentrated solvent to form a polymer material. Already during this solution production process, which is carried out at negative pressure, it was established that NMMO, NMM (N-methylmorpholine=decomposition product of NMMO) and M (morpholine=decomposition product of NMMO and NMM, NMMO=N-methylmorpholine N-oxide) and also water can be separated in the evaporation process via the gas phase.

The spinning process results in expansion evaporation as a result of the extrusion of the spinning material because the spinning material fed to the extrusion nozzle is under a suitable conveying and extrusion pressure and this extrusion pressure is decreased to the ambient pressure of the system once the respective melt particle has exited from the spinneret bore. Spinning pressures up to 250 bar are usual in an NMMO method, depending on the composition (cellulose concentration of the spinning solution). Due to the previously mentioned expansion evaporation or due to the pressure relief of the spinning solution from the high pressure level, at temperatures from to 110° C., to a low pressure level (lower ambient temperature), a violent bubbling movement of the solubilising components (NMMO and $H_2O$) is produced in the filament. The vapour bubbles forming rise from the cellulose solution (flash vaporisation). The escaping particles therefore enter the air gap space in a highly accelerated manner.

Due to the expansion (evaporation of the solubilising components), the energy necessary to evaporate the solubilising components is removed from the spinning solution flow, wherein the filament cools by itself as a result of the energy withdrawal. It has surprisingly been found that not only water (Simon, Int. J. Heat Mass Transfer. Vol. 37, No. 7, pp. 1133-1142, 1994), but also NMMO, NMM and M are evaporated from the spinning solution.

Since the composition of the solubilising component in the spinning solution (NMMO hydrate) is at such a ratio that the evaporated solubilising component (NMMO hydrate) transitions into the crystal form at temperature conditions below 75° C., the particle formation was observed during and after the spinning process and an attempt was made to control this by modifying the process parameters in order to provide a microclimate in the air gap region for an optimally progressing spinning process.

In order to enable the ejection of the evaporated solubilising component (NMMO hydrate), the region of the spinneret surface therefore has to be flushed on the one hand, and on the other hand has to be held at a temperature of at least 75° C. in order to prevent any crystallisation of the evaporated solubilising component (NMMO hydrate) in the vicinity of the spinneret surface.

Aerosols and crystals transported were determined in the flow-off region of the nozzle and are not present in the onflow region of the nozzle. These aerosols, besides the gaseous components, such as air, CO, NMM and M, also consist of the NMMO hydrate compound formed (monohydrate). There are various forms of the monohydrate.

Sampling from the Spinneret Flushing Gas:

The spinning gas was sampled as representatively and loss-free as possible on the exhaust air side, which is charged with aerosols. This was achieved using a measuring probe, wherein the probe was designed in accordance with VDI2066. The design was implemented individually so that isokinetic sampling was ensured.

The sampling line was introduced beneath the spinneret, wherein the positioning of the probe was varied over the height of the air gap and over the distance between the sampling probe and the nozzle midpoint.

Carrying Out the Measurement:

The measurement of the aerosol ejected from the spinning process was carried out using an optical particle counter of the SMPS type (Scanning Mobility Particle Sizer™ Spectrometer) by TSI.

With this method, the particles are electrically charged and are then fractionated in a differential mobility analyser (DMA). The fraction is counted using a condensation core counter. In principle, any fractions can be isolated from the aerosol and counted by varying the control voltage at the DMA. The entire distribution is thus obtained gradually.

Figure 1:
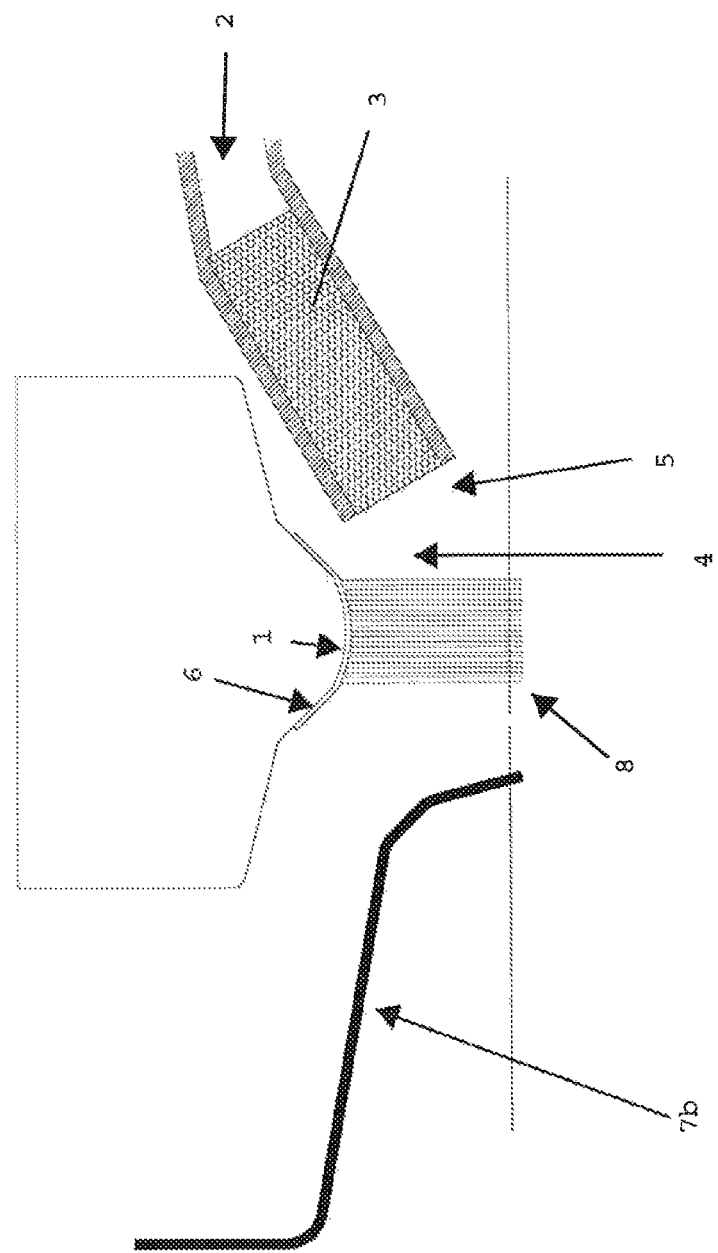
FIGS. 1 to 6 show different extrusion devices comprising an extrusion chamber 9 having extrusion openings 1, a fan 2 with gas flow discharge openings 3, of which the gas flow forms a hot partial flow 4 and a cold partial flow 5. The extrusion openings 1 are provided on an extrusion plate 6 which is curved in the direction of the gas flow. The entry into a collecting bath is denoted by point 8. The extrusion device further has one or more flow-guiding elements 7, which can be provided on the onflow side (a) and/or on the flow-off side (b).
Figure 2:
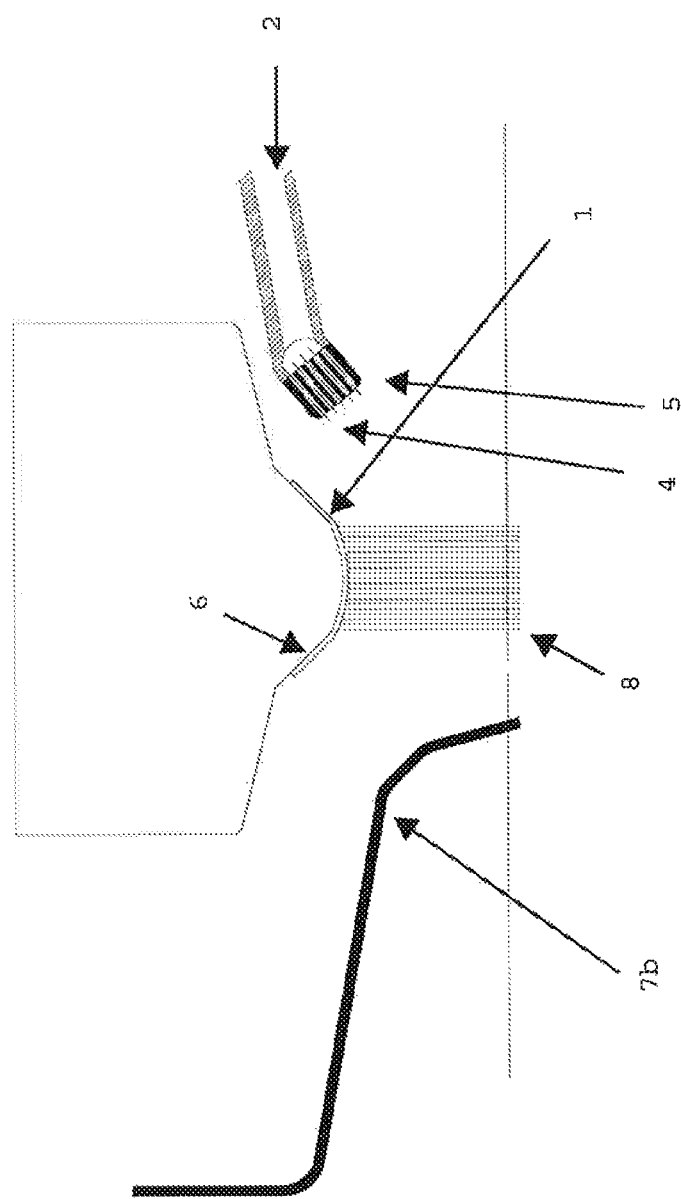
Figure 3:
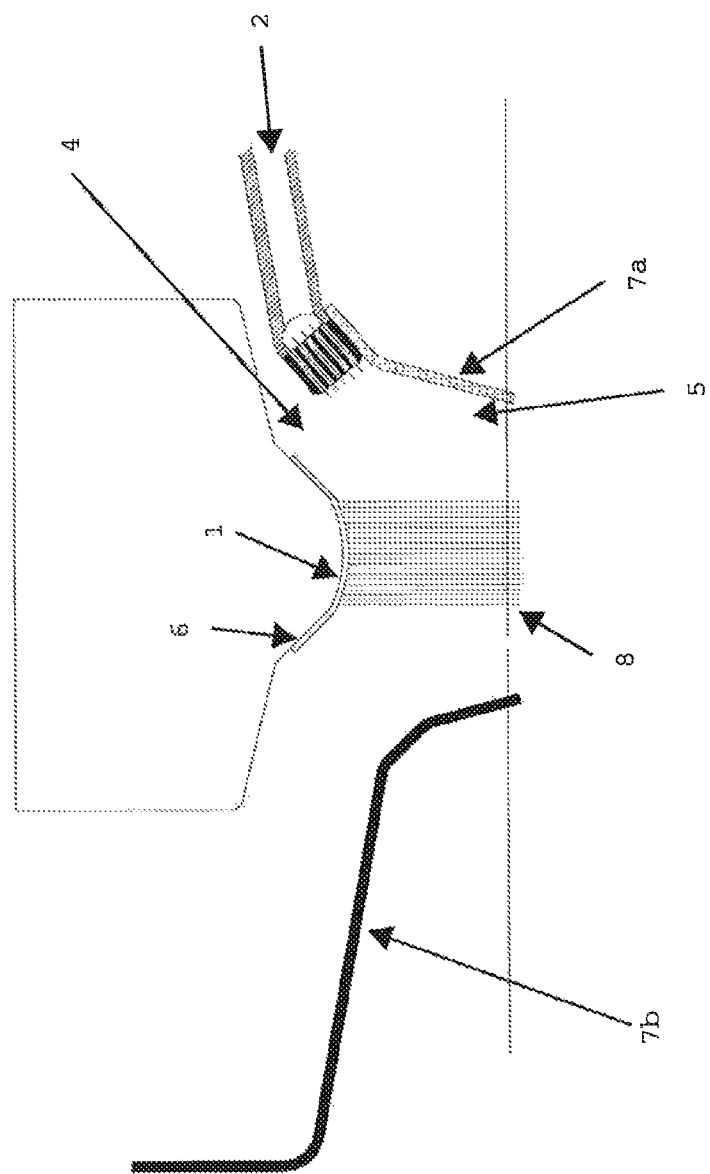
Figure 4:
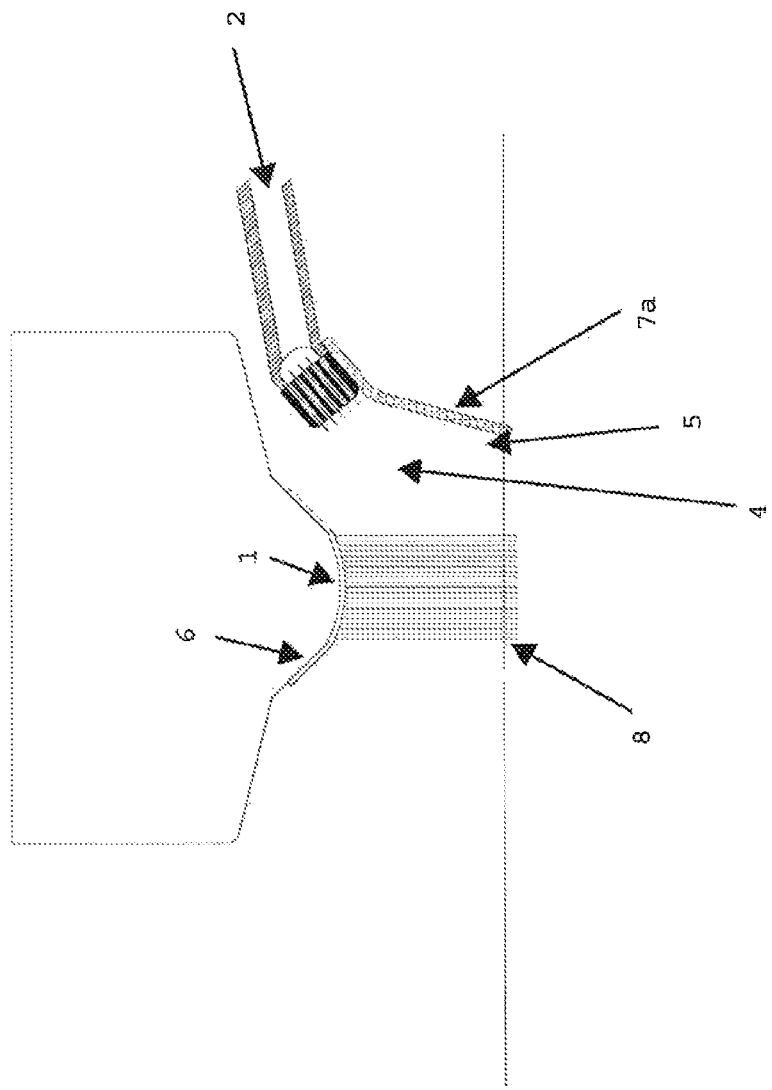
Figure 5:
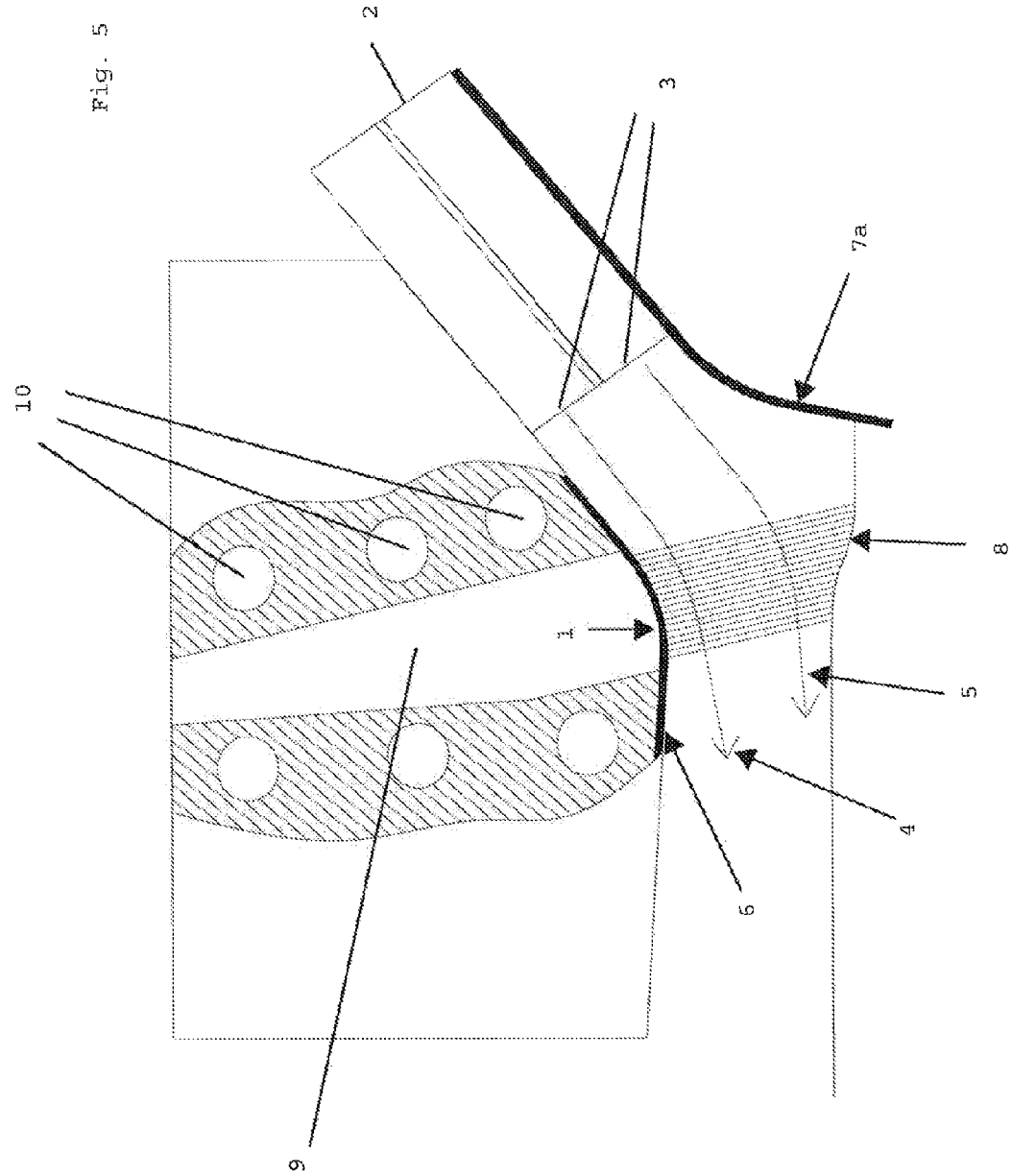
Figure 6:
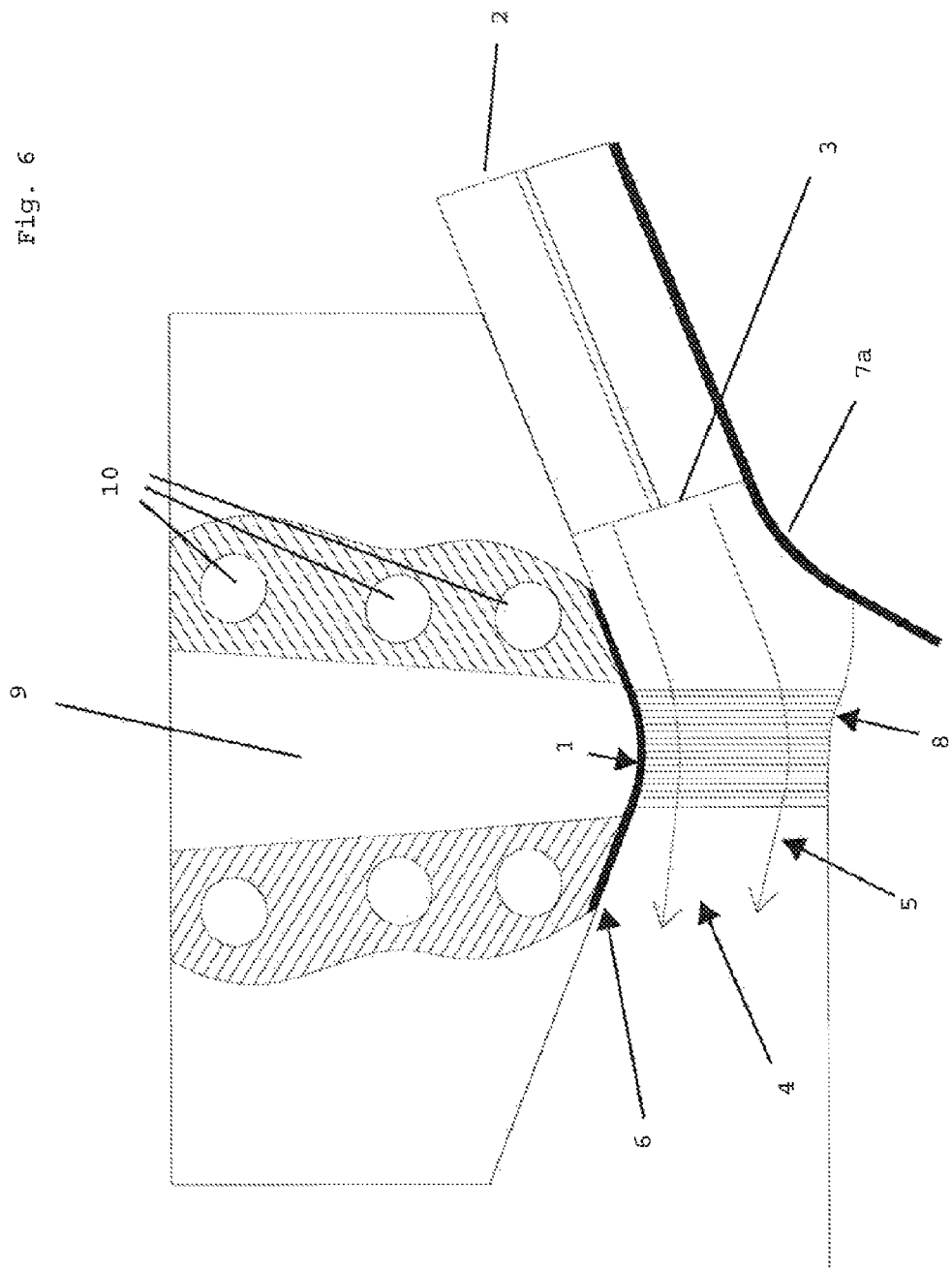

The condensation core counter can detect particles from approximately 3 nanometers in diameter. With regard to particle size, the system is limited upwardly to approximately 1 micrometer of particle diameter.

Sampling was performed in accordance with VDI 2066 using a probe which was fabricated from steel (1.4301) and which was encased and designed as a counterflow heat exchanger. Temperatures between 0° C. and 60° C. were able to be set, wherein the drawn spinning gas volume flow rate was set between 3 m/s and 4 m/s.

The air feed at the spinneret was arranged closely along the longitudinal side of the nozzle and screened the spinneret from the side so that transverse flows by drag could be excluded.

The precipitation bath surface was also covered laterally on the onflow side and also on the flow-off side so that no moisture could be drawn during the measurement.

Filter measurements were also performed for the chemical analysis of the drawn aerosol product in order to analyse the particles in terms of mass in addition to the size analysis. PTFE membranes with pore diameters from 200 to 300 nanometers were used for the filter measurements.

The temperature of the measuring probe was set to 18° C. In this case, the spinning gas temperature was approximately 60° C. The probe was not cooled any lower in order to avoid condensate formation as a result of drawn moisture from the ambient air, since, in accordance with the thesis forming the basis of the invention (separation of NMMO monohydrate crystals from the spinning polymer solution), a feed of moisture via condensate formation would have led to the dissolution of the NMMO monohydrate crystals and it would not have been possible to measure the particle size and number.

FIG. 8 shows a particle size distribution for various positions of the aerosol measurement in an arrangement according to the invention (1) and in a comparative arrangement (2). It can be derived from FIG. 8 that the frequency of particles in the aerosol increases with greater distance from the nozzle. From this, it can be derived that the particles must originate from a condensation/crystallisation process, wherein the crystallisation or the frequencies of particles increases with greater distance from the nozzle.

Since the probe was cooled to 18° C., as a result of which no water crystals could form, the measurement results clearly indicate the presence of aerosols that can be condensed or crystallised. The crystallisation product is to be attributed to an NMMO hydrate compound. The proportion of water in the NMMO hydrate compound is only approximately 13%.

Due to the arrangement according to the invention of the treatment zones of the spinning fibres in the air gap and supply with corresponding flushing gas, the microclimate can be influenced and set in such a way that the nucleation or crystallisation of the NMMO hydrate compound (crystal compound) can be prevented or delayed in the region of the extrusion openings.

Due to layered flushing gas guidance in the spinning gap, the crystallisation heat released from NMMO hydrate by the transporting away of the aerosols/nucleation cores is guided from the spinning space.

Severe cooling in the region of the air gap, but particularly immediately after the shaping, results in increased crystallisation of the previously evaporated NMMO hydrate immediately after the exit from the extrusion opening, whereby the crystallisation heat is introduced into the gas space and the released heat heats the gas space or consequently negatively influences the spinning process.

Results of the Aerosol Filter Sampling

It was found during the measurements that the material filtered from the spinning gas quickly blocks the filter pores of the PTFE filter membrane.

NMMO monohydrate as a crystallised produce could also be determined via tests carried out by light microscopy.

These observations also correspond in so far as NMMO monohydrate crystallises and forms deposits, in the case of a continuously operating spinning device, in the flow-off region, but also in an onflow region not constructed optimally, particularly with use of open jet blasting.

In further comparative tests, the effects on the particle number and also on the spinning behaviour of the cellulose fibres were examined. The individual process parameters are summarised in Table 1.

TABLE 1

| | | Example | | | |
|---|---|---|---|---|---|
| | | 1 | 2 | 3 | 4 |
| Spinning material - throughput | g/min per hole | 0.019 | 0.032 | 0.034 | 0.034 |
| Spinning pressure | bar | 17.100 | 46.000 | 27.000 | 29.500 |
| Temperature of the spinning material | ° C. | 105 | 89 | 89 | 87 |
| Spinning material - spec. volume at spinning pressure and spinning temperature with cooling | ccm/g | 0.895 | 0.862 | 0.879 | 0.881 |
| Spinning material - spec. volume (1 bar and spinning temperature) | ccm/g | 0.932 | 0.932 | 0.932 | 0.932 |
| Spinning material - volume change | % | 4.13% | 8.12% | 6.03% | 5.79% |
| Discharge rate | m/min | 41 | 37 | 39 | 39 |
| Capillary diameter | μm | 100 | 65 | 80 | 80 |
| Extrusion rate | m/min | 2 | 8 | 6 | 6 |
| Draw ratio | | 20 | 5 | 7 | 7 |
| Hole density | | 2.81 | 2.70 | 3.18 | 2.95 |
| Surface temperature of the nozzle | ° C. | 98 | 92 | 89 | 94 |
| Air gap height | mm | 20 | 16 | 16 | 18 |
| Distance between discharge from blowing arrangement and last row of the endless shaped article | mm | 22 | 32 | 32 | 30 |
| Nozzle angle of inclination | ° | 0 | 0 | 0 | 30 |
| Fibre date | | | | | |
| Titre | dtex | 0.74 | 1.39 | 1.36 | 1.38 |
| Coefficient of variation of the titre | % | 37.8 | 21.1 | 23.1 | 9.8 |
| Spinning behaviour | 1 . . . good 5 . . . poor | 5 | 2-3 | 2-3 | 1-2 |
| Wet abrasion number | | 231 | 125 | 250 | 723 |
| Spinning gas treatment flow 1 | | | | | |
| Volume flow per $mm^2$ of nozzle surface | litres/hour per $mm^2$ | 21 | 14.7 | 14.7 | 3.5 |

TABLE 1-continued

|  |  | Example |  |  |  |
|---|---|---|---|---|---|
|  |  | 1 | 2 | 3 | 4 |
| Temperature | ° C. | 20 | 15 | 20 | 90 |
| Separated moisture Spinning gas treatment flow 2 (only Example 4) | g/kg | 8.00 | 8.00 | 10.00 | 12.00 |
| Volume flow per mm² of nozzle surface | Litres/hour per mm² |  |  |  | 5.9 |
| Temperature | ° C. |  |  |  | 25 |
| Separated moisture Spinning gas exhaust gas | g/kg |  |  |  | 12.00 |
| Temperature Aerosol (crystallised NMMO) directly on the nozzle flow-off side | ° C. | 35-45 | 40-50 | 40-50 | 60-80 |
| Particle size with particle maximum |  | 0.7 μm | 0.65 μm | 0.7 μm | 0.6 μm |
| Particle number with particle maximum |  | ~6.5 | ~13.0 | ~9.0 | ~3.0 |
| Aerosol (crystallised NMMO) 200 mm after the nozzle flow-off side |  |  |  |  |  |
| Particle size with particle maximum |  | 0.8 μm | 0.8 μm | 0.8 μm | 0.75 μm |
| Particle number with particle maximum |  | ~14.000 | ~23.500 | ~15.000 | ~11.000 |

In the examples from the synoptical Table 1, the spinning material throughput is specified in g/min and hole, the pressure in the spinneret is specified in bar, the temperature of the spinning material is specified in ° C., and a spinning material formed of 12.9% cellulose, 76.3% NMMO and 10.8% water (all % in % by weight) is specified. In addition, in the table specified above, the specific volume of the spinning material at given spinning pressure and spinning temperature with cooling is specified in ccm/g, and the specific volume of the spinning material at an ambient pressure in bar and spinning temperature is specified in ccm/g. If two spec. volumes are compared, the spinning material volume change specified in the table is thus given in %.

The discharge rate in m/min and also the draw ratio are given via the capillary diameter of the extrusion openings in μm and the extrusion rate in m/min. The specified hole density in hole per mm² and also the surface temperature in ° C., the air gap height of the lateral gas flow in mm and also the distance between the discharge from the air feed arrangement and the last row of the endless shaped article in mm describe the spinning space or the spinning field. The angle of inclination of the nozzle in degrees demonstrates that the method according to the invention can also be carried out with inclined nozzles and with non-perpendicular entry into the spinning bath. Lastly, the titre in dtex describes the desired and set fineness (diameter) of the fibre. The coefficient of variation of titre in % expresses the quality and uniformity of the spinning method or of the different examples. In addition, the spinning behaviour was assessed with the scores 1 to 5, wherein 1 is associated with good spinning behaviour and 5 is associated with poor spinning behaviour. The spinning behaviour was determined visually under consideration of the number of spinning faults, such as fibre breaks and adhesions. The spinning behaviour was classified from 1 (best) to 5 (worst), wherein the method according to the invention demonstrated the best behaviour in accordance with Example 4.

Since the quality of the spun fibres also constitutes an essential feature via the resistance with wet abrasion, the wet abrasion number was specified as a quality-determining feature. A relatively low wet abrasion number indicates fibrillary behaviour of the surface of the spun fibres. By contrast, a relatively high wet abrasion number indicates low fibrillation behaviour at the surface of the spun fibres. For the rest, the wet abrasion number was determined as follows:

The wet abrasion number, a variable characterising fibrillation tendency, was determined using a fibre wet abrasion test apparatus NP by SMK Präzisionsmechanik Gera GmbH. The wet abrasion number is the number of revolutions of the abrasion shaft until breakage of the fibre fixed with a defined pretension in the wet abrasion test apparatus. The pretension weight was 70 mg at a titre between 1.2 and 1.8 dtex. The speed of the abrasion shaft was 400 rpm, and the wrap angle was 45°. The abrasion shaft is provided with a fabric tube.

In accordance with the method and device according to the invention, at least 2 spinning gas treatment flows are fed to the fibre-forming process for the spinning method, wherein treatment flow 1 represents a volume flow rate in liters per hour and mm spinneret length, and, as in Example (example according to the invention), assumes an increased temperature, measured in degrees Celsius.

The spinning gas treatment flow 2 according to the invention, which is likewise expressed in liters per hour and mm spinneret length, is fed to the method or the device according to the invention at a temperature, measured in ° Celsius, below the temperature of treatment flow 1.

An absolute moisture in g/kg of dry air is likewise specified for both spinning gas shaped article treatment flows.

The spinning gas treatment flows passing through the treatment space form what is known as the spinning gas exhaust gas, of which the temperature is measured in degrees Celsius.

It should be noted that comparative examples 1, 2 and 3 were carried out comparatively without the feed of a spinning gas treatment flow 2.

The flash evaporation observed in the spinning solution occurs since the pre-heated spinning material enters an environment of lower pressure, wherein the released quantity of solvent (mixture) implicitly functions on the one hand to cool the polymer flow exiting from the nozzle relief device. In other words, the pressure drop of the polymer flow (cellulose solution) from, for example, 25-50 bar to ambient pressure leads to an overheating of the polymer solution, and the new pressure set in the shaped polymer solution spreads at high speed over the polymer material expanding in the air gap environment. At the same time, the pressure relief is accompanied by a change to the specific volume in cm³/g.

The temperature change is slowed by material transfers, such as heat transfers, at the phase boundary, with the result that it is to be assumed that a thermodynamic equilibrium of the polymer solution or spinning solution is no longer present in the spun fibre. The overheating of the spinning solution occurring as a result of pressure relief is reduced by the energy transfer at boiling nuclei and vapour bubbles of the NMMO/NMM/M/water system.

The energy input into the boiling nuclei of the solution consequently leads to a "microbubble growth" and discharge of the "microbubbles" (microbubble composition NMMO/NMM/M and water) from the viscous polymer fibre, which is also drawn at the same time.

The removal of microbubbles=mass from the polymer solution system in the form of NMMO/NMM/M–H$_2$O vapour (visible as a sublimation product–atomisation by means of a spinneret in an environment of low density), removes temperature from the polymer solution system (=fibre), and the proportions of NMM/M water dissolved in the polymer solution are outgassed.

In the case of the method and device according to the invention, it was possible to detect in the examples that an aerosol formed from crystallised NMMO separates during the spinning process, that is to say it is assumed that the solvent NMMO with bonded hydrate water, and also any occurring NMMO decomposition products, such as NMM and M, discharges from the extrudate and is separated due to the pressure relief via the nozzle channel. In the comparative examples, the aerosol was measured directly on the nozzle flow-off side, wherein the particle size with a particle maximum is specified in μm.

The presented particle number relates to the particle maximum.

In the comparative examples, the spinning gas exhaust gas was subjected at a distance of 200 mm after the nozzle flow-off side to an aerosol measurement for detection of crystallised NMMO, wherein the particle size with a particle maximum is specified in μm and the particle number relates to the particle maximum.

It is clear from the comparative examples that the method/device according to the invention produces a exhaust gas temperature from 60 to 80° C. due to the warm spinning gas treatment flow 1 and the cool spinning gas treatment flow 2. The method according to the invention is characterised in that, due to the two layered gas partial flows, the number of NMMO particles crystallised out directly on the nozzle flow-off side is relatively low due to an increased temperature.

As the distance from the nozzle flow-off side increases, the particle number indeed increases, even with the method according to the invention, but, compared to the prior art, is not of the extent which clearly corresponds to a reduced evaporation/resublimation of NMMO from the extrudate. Comparative examples 1 to 3 all show that increased aerosol formation (crystallised NMMO) occurs directly on the nozzle flow-off side but also at a distance of 200 mm from the nozzle flow-off side due to the cool driving of the spinning gas treatment flow in combination with a relatively large pressure relief via the spinneret (pressure loss in the capillary).

It has surprisingly been found that, via the method according to the invention, illustrated in Example 4, improved textile fibre properties can be set (wet abrasion number) as well as a spinning behaviour that is more stable.

The invention claimed is:

1. A method for producing solid material filaments or films from a fluid, comprising:
   extruding the fluid through one or more extrusion openings;
   solidifying the fluid into the solid material filaments or films by entry in a collecting bath;
   guiding the extruded fluid through a lateral gas flow between the extrusion openings and the collecting bath, wherein the gas flow comprises a hot partial flow and a cold partial flow, the extruded fluid is brought into contact first with the hot partial flow and then with the cold partial flow before entering the collecting bath.

2. The method according to claim 1, wherein the region between the extrusion openings and the collecting bath is flushed substantially completely by the lateral gas flow.

3. The method according to claim 1, wherein the lateral gas flow is laminar, with the result that there is no considerable mixing of the partial flows.

4. The method according to claim 1, wherein the heated partial flow is heated by an extrusion plate comprising the extrusion openings and/or by a heating element in a fan.

5. The method according to claim 1, wherein the material is a thermoplastic material.

6. The method according to claim 1, wherein the material is a cellulose solution.

7. The method according to claim 1, wherein the temperature of the material at the extrusion openings is between 70 and 130.degree. C.

8. An extrusion device for producing solid material filaments of films, the device comprising:
   an extrusion plate having a cambered region and one or more extrusion openings;
   a gas fan including a plurality of discharge openings configured for laterally blowing a gas flow onto a material pressed through the extrusion openings, wherein a part of the gas flow is guided as a hot partial flow and another part is guided as a cold partial flow;
   a guide element configured for guiding the gas flow along said cambered region of said extrusion plate; and
   at least one heating element configured for heating the gas flow in the hot partial flow.

9. The device according to claim 8, wherein the coefficient of thermal conduction of the extrusion plate is 5 to 100 W/mK.

10. The device according to claim 8, further comprising a plurality of extrusion openings provided in the direction of the lateral gas flow.

11. The device according to claim 10, wherein the extrusion openings are on a cambered extrusion plate, and wherein the angle of curvature, a, at the edge of the extrusion plate to the direction of extrusion is an acute angle.

12. The device according to claim 8, wherein the fan is arranged at an acute angle to the direction of extrusion.

13. The device according to claim 8, wherein the extrusion plate comprises a heating element.

14. The device according to claim 8, wherein the coefficient of thermal conduction of the extrusion plate is 10 to 60 W/mk.

* * * * *